(12) United States Patent
Kelley et al.

(10) Patent No.: US 6,229,334 B1
(45) Date of Patent: May 8, 2001

(54) VOLTAGE OVERSHOOT CONTROL

(75) Inventors: Richard Allen Kelley, Apex, NC (US); Danny Marvin Neal, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,916

(22) Filed: Sep. 30, 1998

(51) Int. Cl.$^7$ .................................................. H03K 17/16
(52) U.S. Cl. ............................................ 326/30; 326/86
(58) Field of Search .............................. 326/30, 82, 86; 333/22 R; 340/825.05, 825.01, 825.06

(56) References Cited

U.S. PATENT DOCUMENTS

| | | | |
|---|---|---|---|
| 3,711,834 | 1/1973 | Rogers | 340/166 R |
| 5,089,766 | 2/1992 | Iwatani | 322/25 |
| 5,418,403 | 5/1995 | Morell, III | 307/72 |
| 5,612,634 | * 3/1997 | MacKenna | 326/62 |
| 5,646,572 | 7/1997 | Masleid | 327/545 |
| 5,920,266 | * 7/1999 | Allgood et al. | 340/825.05 |
| 5,996,035 | * 11/1999 | Allen et al. | 710/103 |

OTHER PUBLICATIONS

IBM Technical Disclosure Bulletin vol. 29 No. 10 Mar. 1987 "Power On/Off Sequencing of Dual Voltage Regulators".
IBM Technical Disclosure Bulletin vol. 26 No. 5 Oct. 1983 "Laser Diode Controller".

* cited by examiner

Primary Examiner—Michael Tokar
Assistant Examiner—Anh Tran
(74) Attorney, Agent, or Firm—Robert V. Wilder; Leslie A. Van Leeuwens

(57) ABSTRACT

A method and implementing computer system is provided in which PCI bus load conditions are detected and dummy loads are selectively switched into the PCI bus under light load conditions in order to avoid voltage overshoot problems. Load control logic receives input signals representative of the presence or absence of adapters connected into PCI slots. The load control logic is connected to load control switches. The load control switches are arranged to selectively connect to the PCI slot or to a dummy load. The load control system is selectively operable, by controlling the load switches, to connect dummy loads into empty PCI slots to dampen the bus when light load conditions are detected to exist on the PCI bus. In a PCI system hot plug environment, the system is operable to quiesce the slot being hot plugged so that the adapter can be removed or inserted into a PCI slot while maintaining acceptable PCI bus loading conditions.

15 Claims, 4 Drawing Sheets

| SLOT#1 | SLOT#2 | SLOT#3 | SLOT#4 | S1 | S2 | S3 | S4 |
|---|---|---|---|---|---|---|---|
| 3V | E | E | E | SLOT #1 | L2 | L3 | L4 |
| 3V | 3V | E | E | SLOT #1 | SLOT #2 | L3 | L4 |
| 3V | 3V | 3V | E | SLOT #1 | SLOT #2 | SLOT #3 | L4 |
| 3V | 3V | 3V | 3V | SLOT #1 | SLOT #2 | SLOT #3 | SLOT #4 |

| SLOT#1 | SLOT#2 | SLOT#3 | SLOT#4 | S1 | S2 | S3 | S4 |
|--------|--------|--------|--------|----|----|----|----|
| 3V | E | E | E | SLOT #1 | L2 | L3 | L4 |
| 3V | 3V | E | E | SLOT #1 | SLOT #2 | L3 | L4 |
| 3V | 3V | 3V | E | SLOT #1 | SLOT #2 | SLOT #3 | L4 |
| 3V | 3V | 3V | 3V | SLOT #1 | SLOT #2 | SLOT #3 | SLOT #4 |

US 6,229,334 B1

VOLTAGE OVERSHOOT CONTROL

RELATED APPLICATIONS

The present application is related to a co-pending application entitled "VOLTAGE OVERSHOOT CONTROL IN HOT PLUG SYSTEM", U.S. Ser. No. 09/163,922, filed on even date herewith and assigned to the assignee of the present application. Subject matter disclosed but not claimed herein is disclosed and claimed in the related application.

FIELD OF THE INVENTION

The present invention relates generally to information processing systems and more particularly to a system architecture which includes means for controlling voltage overshoot.

BACKGROUND OF THE INVENTION

Computer environments which contain many reactive elements must be treated as a non-terminated, transmission line environment. Thus, a signal must travel to the end of a signal line and be reflected back or return to the driver before the signal is considered "switched". This environment is conducive to "ringing", which, in turn, under certain conditions, causes relatively large voltage "overshoots" to occur in switching between voltage levels. As used herein, the term "overshoot" refers to the initial and/or trailing edges of a signal temporarily greatly exceeding the steady state voltage level to which the signal is transitioning.

The PCI (Peripheral Component Interconnect) computer system specification ("PCI Local Bus Specification", Revision 2.1, dated June, 1995), is an example of a computer environment which contains many reactive elements. The PCI Specification defines limits and tolerances for compliance with the Specification. The PCI Specification for 33 MHz devices defines that the maximum voltage overshoot allowed is +11 volts for a maximum of 11 nsec. This is considered the "worst case" situation for the PCI bus. This limitation presents a problem for "universal" PCI add-in cards, which must include 3.3 volt technology that is "5 volt tolerant", and therefore subject to the 11 volt maximum overshoot. Typically, clamping diodes are implemented to limit voltage overshoots. However, with the increased overshoot exposure with 3.3 volt devices, the clamping diodes on the universal adapters or cards can fail over time due to the excessive current flow caused by the overshoot voltages (metal migration).

Thus there is a need for an enhanced computer system and methodology which is designed to control voltage overshoot problems in computer systems.

SUMMARY OF THE INVENTION

A method and implementing computer system configuration is provided in which PCI bus load conditions are detected and load devices are selectively connected to the PCI bus to dampen lightly loaded systems and limit voltage overshoots on the PCI bus.

BRIEF DESCRIPTION OF THE DRAWINGS

A better understanding of the present invention can be obtained when the following detailed description of an exemplary embodiment is considered in conjunction with the following drawings, in which.

DETAILED DESCRIPTION

Figure 1:
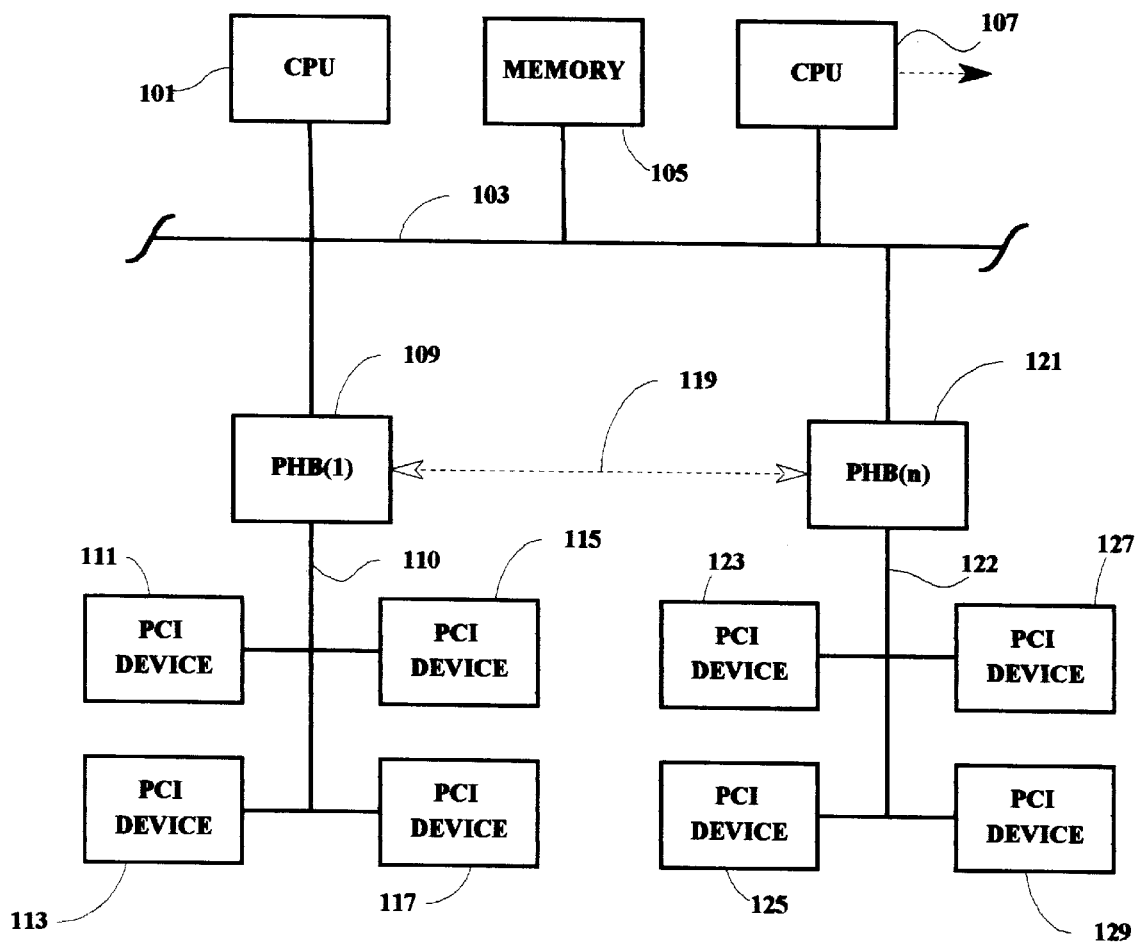
FIG. 1 is a diagram of a computer system including an exemplary PCI configuration.

The various methods discussed herein may be implemented within a typical computer system which may, for example, be embodied in a workstation or personal computer or larger computer system. In general, an implementing computer system may include a plurality of processors in a multi-bus system, in a network of similar systems. However, since the workstation or computer system implementing the present invention in an exemplary embodiment, is generally known in the art and composed of electronic components and circuits which are also generally known to those skilled in the art, circuit details beyond those shown in the drawings are not specified to any greater extent than that considered necessary as illustrated, for the understanding and appreciation of the underlying concepts of the present invention, and in order not to obfuscate or distract from the teachings of the present invention.

In FIG. 1, a computer system includes a CPU (central processing unit) 101 connected to a system bus 103. Also connected to the system bus 103 is a memory unit 105. The computer system may also include additional CPUs such as CPU 107 and other subsystems and network connections which may be connected on extended portions of the bus 103. A first PHB (PCI Host Bridge) circuit 109 is connected to the system bus 103 and is also connected to a first PCI bus 110. Four PCI devices 111, 113, 115 and 117 are shown connected to the PCI bus 110 which may also have additional PCI devices connected thereto. The illustrated system may have a plurality 119 of PHB circuits connected to the system bus 103 of which PHB(n) 121 represents the last one of a series including "n" PHB circuits. PHB(n) also connects the system bus to a PCI bus 122 to which are connected additional PCI devices 123, 125, 127 and 129. Additional PCI devices may also be connected to extended segments of the PCI bus 122.

Although the system shown in FIG. 1 includes four PCI devices connected to each PCI bus 110, 122, the system actually has connection "slots" on a motherboard or planar board into which PCI cards or "adapters" may be inserted. Typically, when the PCI slots are occupied with PCI devices, the circuit is sufficiently "loaded" such that voltage overshoot is not a significant problem. However, when a system set-up does not include a device in every slot, the system is considered to be lightly loaded and voltage overshoot problems become more apparent. The overshoot problem is even more of a concern when one or more of the plugged-in PCI devices is a 3 volt device or a universal device which includes 3 volts components.

In PCI slots for example, there are "pin-outs" which can be read and signals detected to determine if a device is plugged-into a particular slot. Other pin-outs can be sensed to determine certain characteristics of the plugged-in device. The present invention provides a method and apparatus by which the load conditions on a PCI bus are sensed and, for light load conditions, "dummy" load devices are selectively connected to otherwise unconnected slots in order to control overshoot voltages in the system.

Figure 2:
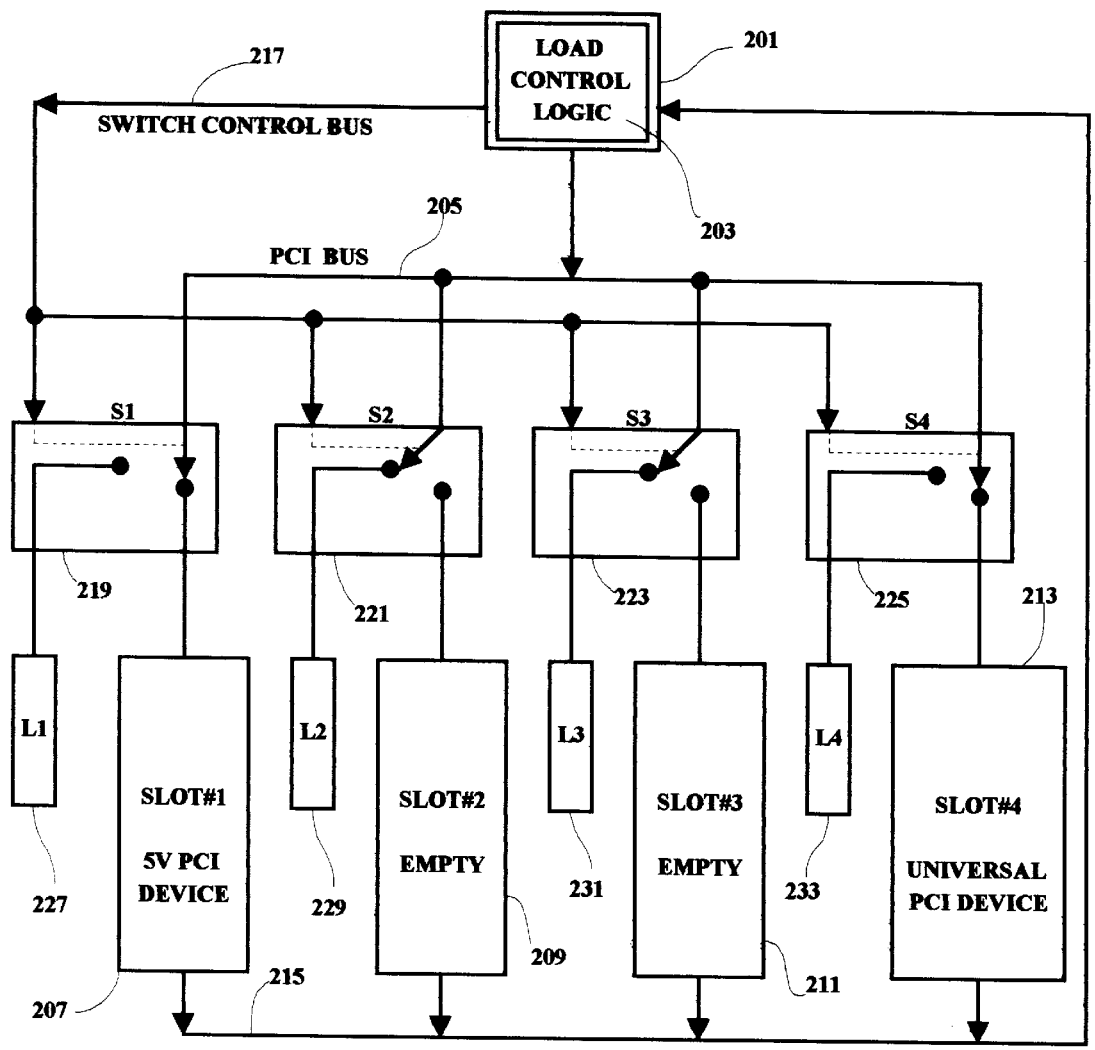
FIG. 2 is a block diagram illustrating a PCI configuration including voltage overshoot control circuitry.

In FIG. 2, an exemplary PCI system is illustrated including voltage overshoot control circuitry in accordance with the present invention. As shown, a PCI host bridge 201 is connected between a system bus (not shown) and a PCI bus 205. The PHB 201 includes load control logic circuitry 203. In the FIG. 2 example, a 5 volt PCI device 207 is shown connected in slot #1 of the PCI bus 205. The second slot 209 is shown in an unconnected or empty state, i.e. slot #2 has no PCI device connected. The third slot 211 is also shown in an unconnected or empty state, and a fourth slot is shown to have a universal PCI device or adapter 213 connected thereto. All four of the PCI slots have control signal output lines connected to a control signal bus 215. The control signals applied to the control signal bus 215 include "presence detect" signals from the PCI slots which indicate the presence or absence of a PCI device in each of the four slots shown in the exemplary embodiment.

The control signal bus 215 is connected back to the load control logic circuit 203. Although the load control logic circuit 203 is shown in the present example as being part of the PHB 201, it is understood that the load control logic may be implemented elsewhere in the system. The load control logic circuit 203 provides switch control signals on a switch control bus 217 which is connected to four load switching devices 219, 221, 223 and 225, which are designated S1, S2, S3 and S4, respectively, to correspond to the four PCI slots in the present example. The load switches S1–S4 are connected to corresponding load devices 227, 229, 231 and 233, which are correspondingly designated L1, L2, L3 and L4, respectively. The load switching devices S1–S4 are selectively actuated by means of the switching signals from the load control logic 203 to switch-in the corresponding load devices L1–L4 under certain detected predetermined conditions representative of a light load PCI bus condition.

In the FIG. 2 example, a 5 volt PCI card 207 is shown connected in PCI slot #1 and a universal PCI card 213 is shown connected in PCI slot #4. The middle two PCI slots 209 and 211 as shown as not having any PCI cards plugged-in or connected thereto. The PRSNTx# lines for each of the four PCI slots are routed by means of the control signal bus 215 to the load control logic 203 which generates switching signals for application to load switches S1–S4 to connect dummy loads L1–L4 to the PCI bus as determined by the logic circuit 203. In the present example, a "light load" condition is considered to exist if any of the slots are empty. A determination is made as to which of the PCI slots is vacant or empty by decoding the PRSNT signals from the PCI slots. When a light load condition exists, (i.e. in the present example, when any of the slots are empty), appropriate ones of the switching signals are generated to switch dummy loads L2 and L3 (for example a load of 10 pF to ground) into the empty PCI slots, i.e. slot#2 209 and slot#3 211. The dummy loads assure that the PCI bus is never lightly loaded. The load switching creates a dampening of ringing and controls the voltage overshoot which would otherwise occur. Thus the dummy loads L1–L4 serve to protect the devices on the bus when a lightly loaded bus condition would otherwise occur to cause voltage overshoot and the resulting long term component breakdown.

Figures 3, 4:
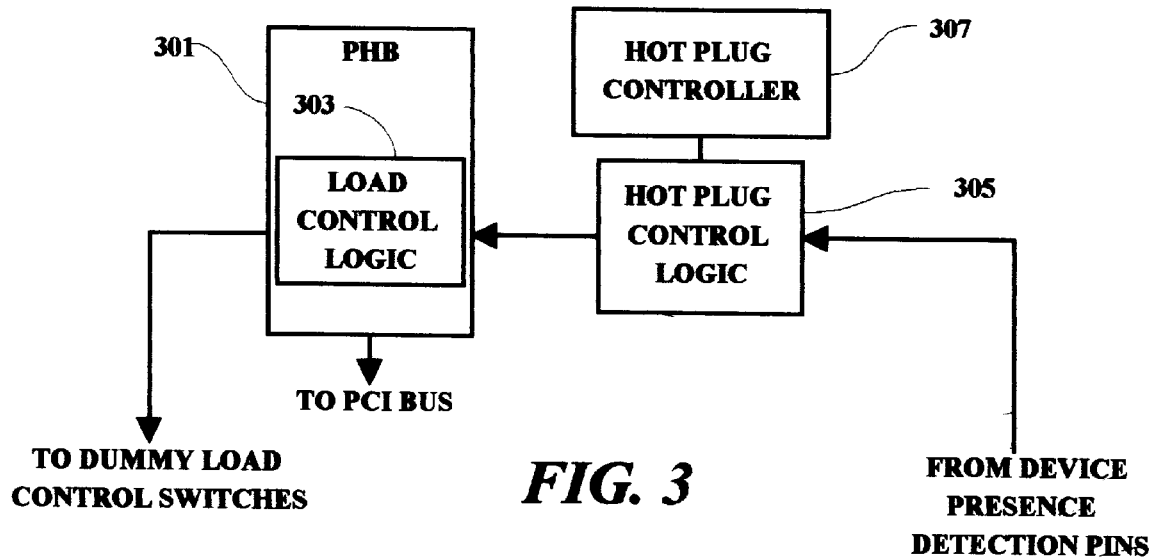
FIG. 3 is an illustration of additional circuitry which may be implemented to provide hot plug control for the PCI configuration.
FIG. 4 is a logic chart illustrating several logical relationships among the signals generated in the PCI-adapted load control circuitry.

In FIG. 3, an so called "hot plug" environment is illustrated. In a hot plug environment, it is possible to remove or install PCI cards into PCI slots while the system is operational. This can be accomplished by quiescing, isolating and powering-down the adapter or card to be removed during a "hot-plug" procedure. The other adapters on the bus can continue operation since the slot with the adapter being removed is first isolated from the rest of the bus during the hot plug operation. There are a number of ways to isolate the slot from the bus for a hot plug operation. For example, a slot could be isolated behind a PCI—PCI bus. In another example, a slot could be isolated from the bus by providing a set of electronic in-line switches between each slot and the PCI bus. The set of switches would switch each of the bus signal lines to the slot. To isolate any switching noise from the bus during switch state changes, the hot plug controller would arbitrate for the bus to make the switch state changes while the hot plug controller has control of the bus.

The overshoot problem also applies to hot plug arrangements since even though a PCI bus may be load-balanced to avoid a light load situation at set-up, whenever a card is removed from a slot, the PCI loading condition will be reduced. The load reduction in such a case may be such that a light load condition will exist and the circuit will again become susceptible to ringing and voltage overshoot conditions. In FIG. 3, a hot plug control logic circuit 305 receives control signals from the PCI slots including device presence detection signals and also from a hot plug controller circuit 307 and provides hot plug control signals to a load control logic circuit 303 which, in the example, is within a PHB circuit 301. The load control logic outputs dummy load switching signals to load switches as shown in FIG. 2. During a hot plug action, when an adapter slot is isolated from the bus, the corresponding switch S(n) at the slot connects the dummy load L(n) to the bus. The hot plug controller will then de-isolate the adapter being hot plugged, and the corresponding switch S(n) connects the adapter back to the bus. In such an arrangement, dummy loads are normally connected across empty PCI slots on a PCI bus, and when a PCI device is plugged-in at power-on or as a result of a hot plug action, the load switch to the dummy load is opened by the hot plug control logic, and connected to the slot being occupied by the PCI device. That implementation assures that the PCI bus will never be in a light load condition and that whenever a PCI device is removed from a slot, a dummy load is automatically connected across the slot to add load and reduce ringing.

To avoid introducing any errors on the PCI bus when the hot plug controller 307 and the load control logic 303 change the state of the load switches S1–S4, it is necessary for the bus to be idle when the switches change state. This is not a problem in a "power-on" situation in a non-hot plug environment since the load control logic 203 can set the state of the switches based on the PRSNT pins to connect the dummy load if the slot is empty or to connect the adapter if the slot is occupied. In a hot plug environment, the hot plug protocol must also be included in the control of the load switches S1–S4.

In FIG. 4, an exemplary condition table is illustrated to show what conditions are required to change the state of the dummy load switches S1–S4 (FIG. 2). As shown in the table, in a first exemplary situation, when a 3 volt card is installed in slot #1, and the other three PCI slots are empty, the load control logic 303 and hot plug control logic 305 will determine from the PRSNT lines from the PCI slots and the hot plug protocol, that there is a potential "light load" condition and the output switching signals will be effective to change the state of switch S1 to disconnect the dummy load L1 since there is a PCI device installed in that slot. Further, since the other three slots are empty, the load control logic 303 will provide load switching signals on bus 217 which are effective to change the state of switches S2–S4 and thereby switch-in dummy loads L2–L4, respectively.

When a 3 volt card is installed into a PCI slot, it is more important to avoid a light load situation on the PCI bus since voltage overshoot is more likely to be damaging to the 3 volt components on the plugged-in PCI card. Although the above operation describes always connecting either an adapter or a dummy load at each slot to assure that all slots are connected to either a real load, i.e. an adapter, or a dummy load, it is noted that the load logic and other control logic could be implemented to assure that at least a minimum number of loads would always be connected.

Figure 5:
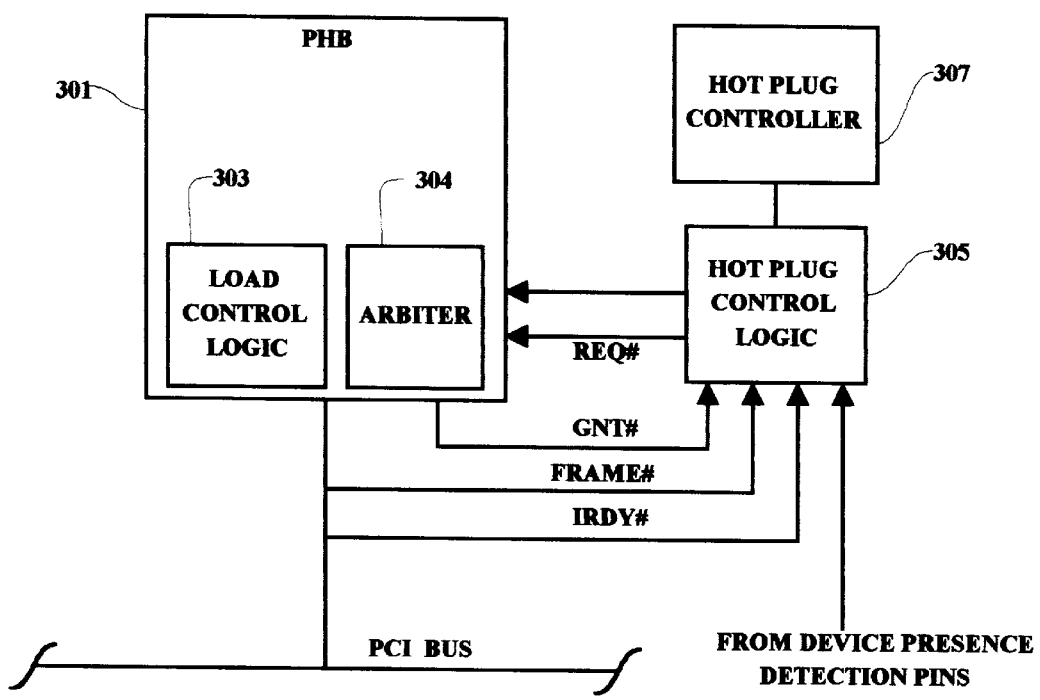
FIG. 5 is a more detailed drawing of a hot plug circuit showing several of the PCI signals used in the illustrated exemplary embodiment.

As illustrated in FIG. 5, during a hot plug sequence, an operator initiates the sequence by requesting at a keyboard that a specific adapter be hot plugged. Hot plug software along with the device driver quiesces the adapter such that the adapter is not doing operations on the PCI bus. The hot plug controller 307 then isolates the PCI bus via a set of in-line load switches S(n) at slot "n". This is done by the hot plug controller 307 activating its REQ# line and the arbiter 304 and the arbiter 304 granting the PCI bus to the hot plug controller 307. The hot plug controller monitors the bus for an idle bus (i.e. when FRAME# and IRDY# are inactive), to assure that the previous master is off the bus. The hot plug controller 307 and the load control logic then change the state of the set of load control switches S(n) at the slot of the hot plug action. That action disconnects the slot and connects the dummy load. When the hot plug controller 307 releases its REQ# line, the arbiter 304 is free to arbitrate and grant the bus to another device. The adapter being hot plugged is now isolated and can be powered down and replaced. When the operator is ready to un-isolate the new card that was plugged in, the operator makes a request at the keyboard. The hot plug controller 307 then requests the bus again by activating its REQ# line, and the request is granted by the arbiter by activating its GNT# line. The hot plug controller changes the state of the load switches while it has control of the bus, disconnecting the dummy load and reconnecting the slot. Therefore a bus can be maintained fully loaded with either adapters plugged into the slots or with dummy loads connected at the slots regardless of how many adapters are actually plugged into slots. In this manner, a lightly loaded bus situation can be avoided by utilizing the set of load switches and control logic to assure that either an adapter or a dummy load will be connected at each slot thereby avoiding the problem of excessive voltage overshoot.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for controlling load conditions on a bus within an electronic system, said method comprising:
   determining a load condition on said bus; and
   changing loads connected to said bus in response to said load condition to effect a predetermined load condition on said bus, wherein said electronic system further includes a plurality of connection slots arranged for being selectively coupled to said bus, said connection slots being arranged for being selectively connected to adapter devices, said determining being accomplished by detecting which of said connection slots has an adapter device connected thereto.

2. The method as set forth in claim 1 wherein said electronic system is a computer related system and said bus is a PCI bus.

3. The method as set forth in claim 1 wherein said adapter devices include connection pins for connecting to said connection slots, said determining being accomplished by detecting a first predetermined connection condition of predetermined ones of said connections pins.

4. The method as set forth in claim 3 wherein said predetermined connection condition is a detected absence of predetermined ones of said connection pins.

5. The method as set forth in claim 3 and further including:
   operating a switching means when said first predetermined connection condition is detected, said switching means being operable to connect said bus to a dummy load device.

6. The method as set forth in claim 5 wherein said switching means is operable in response to a second predetermined connection condition for connecting said bus to one of said connection slots.

7. The method as set forth in claim 6 wherein said second predetermined connection condition is a detected presence of said predetermined ones of said connection pins.

8. A control system for controlling load conditions within an electronic system, said control system comprising:
   a bus;
   a plurality of connection slots arranged for selective connection to said bus, said connection slots being capable of being connected to adapter devices; and
   control means coupled to said connection slots and said bus, said control means being operable for detecting a connected load condition on said bus, said control means being further operable for effecting a change in load connections to said bus in response to said detected connected load condition.

9. The control system as set forth in claim 8 wherein said electronic system is a computer related system and said bus is a PCI bus.

10. The control system as set forth in claim 8 wherein said electronic system further includes a plurality of connection slots arranged for being selectively coupled to said bus, said connection slots being arranged for being selectively connected to adapter devices, said connected load condition being detected by detecting which ones of said connection slots has one of said adapter devices connected thereto.

11. The control system as set forth in claim 10 wherein said adapter devices include connection pins for connecting to said connection slots, said detecting being accomplished by detecting a first predetermined connection condition of predetermined ones of said connection pins.

12. The control system as set forth in claim 11 wherein said first predetermined connection condition is a detected absence of predetermined ones of said connection pins.

13. The control system as set forth in claim 11 and further including:
   dummy load terminal means arranged for being selectively connected to a series of dummy load devices; and
   a switching means connected to said bus and said control means, said switching means being responsive to control signals from said control means for effecting a connection between said bus and said dummy load terminal means when said first predetermined connection condition is detected.

14. The control system as set forth in claim 13 wherein said switching means is operable in response to a second predetermined connection condition for connecting said bus to one of said connection slots.

15. The control system as set forth in claim 14 wherein said second predetermined connection condition is a detected presence of said predetermined ones of said connection pins.

* * * * *